United States Patent Office 3,647,874
Patented Mar. 7, 1972

1

3,647,874
N-CYANOBENZOYLHALOALKYLSULFON-
ANILIDES
John F. Gerster, Woodbury, Minn., assignor to Riker
Laboratories, Inc., Northridge, Calif.
No Drawing. Filed Apr. 13, 1970, Ser. No. 28,021
Int. Cl. C07c 143/74
U.S. Cl. 260—556 F                  7 Claims

ABSTRACT OF THE DISCLOSURE

N-cyano benzoylhaloalkylsulfonanilides in which the aromatic rings are optionally substituted. The compounds are active anti-inflammatory agents.

This invention relates to N-cyano benzoylhaloalkyl-sulfonanilides in which the aromatic rings are optionally substituted. These compounds are active anti-inflammatory agents and some also anti-microbial agents.

It is an object of the invention to provide compounds which are anti-inflammatory agents.
It is another object of the invention to provide compounds for the control of microbes.
It is a further object of the invention to provide a method for controlling inflammation in mammalian tissue.
It is still another object of the invention to provide anti-inflammatory compositions containing one or more N-cyano benzoylhaloalkylsulfonanilides as active ingredients therein.
It is still another object of the invention to provide anti-microbial compositions containing one or more N-cyano benzoylhaloalkylsulfonanilides as active ingredients therein.
Still other objects will be made apparent by the following specification.

DETAILED DESCRIPTION

According to the present invention, there is provided a class of compounds of the formula:

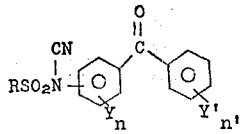

wherein R is a haloalkyl group selected from chloromethyl and lower fluoroalkyl, the fluoroalkyl radical having at least one fluorine atom bonded to the alpha carbon atom or at least two fluorine atoms bonded to a beta carbon atom, Y and Y' are the same or different and are selected from halogen, lower alkyl, lower haloalkyl, lower alkoxy and lower haloalkoxy and $n$ and $n'$ are the same or different and are from zero to three.

The term lower when applied to substituent groups (radicals) of this invention, such as alkyl, alkoxy, haloalkoxy and fluoroalkyl, refers to groups containing one to about four carbon atoms.

When R is fluoroalkyl, it can be straight or branched chain perfluoroalkyl or partially fluorinated alkyl, and it can contain chlorine. As noted previously, R should have at least one fluorine bonded to the alpha carbon

2 atom, or if there is no fluorine bonded to the alpha carbon atom at least two fluorines bonded to the beta carbon atom. The compounds in which R is trifluoromethyl are most preferred. When $n$ is zero, the ring adjacent to the haloalkylsulfonamido group is unsubstituted except for that group and the benzoyl group. Similarly, when $n'$ is zero, the second ring is unsubstituted except for the group shown in the formula and attached thereto through the carbonyl link.

The compounds of the invention are generally active as anti-inflammatory agents. The compounds in which R contains one or two carbon atoms are preferred, since such compounds are usually more active, and compounds wherein R contains but one carbon atom, normally fluorinated, are most preferred. Those compounds wherein $n$ and $n'$ are zero are usually preferred. Also preferred are those compounds in which the nitrogen atom and the carbonyl group of Formula I are oriented meta to one another.

The compounds of the present invention are prepared according to the following reaction:

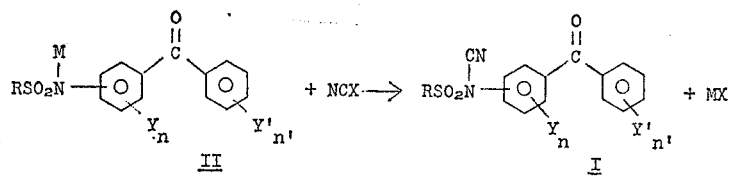

wherein R, Y, Y', $n$ and $n'$ are as defined hereinabove, M is a cation, e.g. of alkali metals, alkaline earth metals, or aluminum (preferably alkali metals due to ease of preparation) and X is halogen (preferably chlorine or bromine due to the availability and relatively lower cost of the intermediate compounds).

The reaction is preferably carried out under anhydrous conditions, since the compounds of the invention may react with water. A non-reactive organic solvent, preferably one in which the salts of Formula II have some solubility, is used, such as acetone, 1,2-dimethoxyethane, 1,2-diethoxyethane, diethyl ether, diisopropyl ether, dichloromethane, chloroform and the like.

The reaction temperature may vary from the freezing point to the boiling point of the solvent used. In some cases the reaction has been run at the reflux temperature of the solvent, while in others an ice bath or room temperature reaction has been satisfactory.

The reaction product is preferably isolated by filtration to remove the salt MX which is formed as a by-product, followed by evaporation of the solvent. This procedure gives quite pure product when a solvent is chosen which does not dissolve the salt MX appreciably. Alternatively the product may be extracted from the salt MX after removal of the reaction solvent, or the product mixture may be separated by elution chromatography.

The compounds of the present invention are generally liquids, oils or low-melting solids which do not crystallize readily yet do not distill easily. They are preferably purified, when purification is necessary, by sublimation or elution chromatography, although some do recrystallize or distill.

The salts of Formula II are prepared from the corresponding acid form compound

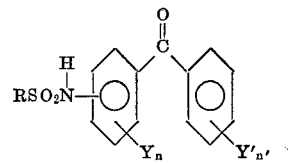

III by adding the stoichiometric amount of a base in inert solvent solution (aqueous or nonaqueous) to the acidic compound (III). The resulting solution is treated to remove the solvent, e.g., by evaporation under reduced pressure to obtain the salt, usually as a dry powder. Appropriate bases for use in preparing the metal salts include metal oxides, carbonates, bicarbonates and alkoxides. Compounds of Formula II wherein M is aluminum, alkali metals, alkaline earth metals and amines are prepared in this way. Compounds wherein M is sodium are generally preferred because they are readily available and relatively inexpensive.

The acid form compounds (III) are prepared by condensing an aminobenzophenone with a haloalkylsulfonyl halide or anhydride according to the following scheme:

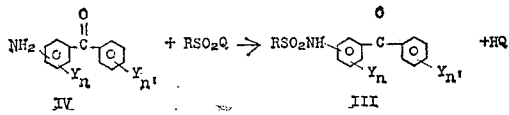

wherein R, $n$, $n'$, and Y' are as previously defined and Q represents a halogen atom, preferably chlorine or fluorine, or the corresponding anhydride group —$OSO_2R$ (R being defined as above). Approximately equivalent amounts of the reactants are brought together at temperatures most often ranging between about $-15$ and $150°$ C. If necessary or desirable, the reaction can be carried out in a pressure vessel. The reaction is preferably, but not necessarily, carried out in the presence of an acid acceptor such as the alkali or alkaline earth metal carbonates and bicarbonates or a tertiary amine such as pyridine, triethylamine or N,N-dimethylaniline. The amount of the acid acceptor can be varied widely; however, a 10 mole percent excess of that amount of base sufficient to bind the liberated strong acid (HQ) is routinely employed.

The condensation is usually conducted in the presence of an appropriate inert organic solvent. Typical solvents suitable for this purpose are methylene chloride, chloroform, carbon tetrachloride, benzene, toluene, bis(2-methoxyethyl)ether, acetonitrile, nitromethane, and the like.

After reaction is complete, if the reaction solvent is not water miscible, the product mixture can be extracted with a dilute aqueous base solution. The product, in the form of a salt which is usually soluble in the aqueous layer, is precipitated therefrom by addition of a mineral acid such as hydrochloric or sulfuric acid, and collected by filtration. Alternatively the product mixture can be washed with aqueous hydrochloric acid, the solvent evaporated in vacuo, and the residue dissolved in a dilute aqueous base solution which is washed with dichloromethane and treated with decolorizing charcoal. The product, in the form of a salt is then isolated as described above.

If the reaction solvent is water miscible, the product is generally obtained by dilution of the reaction mixture with water. The product, a solid or oil, is separated and purified by conventional methods. The compounds prepared according to the foregoing procedures are crystalline solids purified, in general, by recrystallization from aqueous alcohol, trichloroethylene, hexane, benzene-hexane mixtures and the like. Elution chromatography has also been found to be a useful purification technique.

Suitable haloalkanesulfonylanhydrides and halides (e.g. chlorides and fluorides) for use as starting materials in these procedures are known to the art, for example:

fluoromethanesulfonyl chloride,
fluorochloromethanesulfonyl chloride,
difluoromethanesulfonyl chloride,
chloromethanesulfonyl chloride,
2,2,2-trifluoroethanesulfonyl chloride,
trifluoromethanesulfonyl chloride,
1,1,2,2-tetrafluoroethanesulfonyl chloride,
2,2,3,3-tetrafluoropropanesulfonyl chloride,
2-hydroperfluoropropanesulfonyl chloride, and many others disclosed, e.g. in U.S. Pat. 2,732,398.

Most of the aminobenzophenones, IV, are described in the general chemical literature or can be prepared from corresponding known substituted nitrobenzophenones by reduction. All of the nitrobenzophenones or aminobenzophenones not specifically disclosed in the chemical literature are prepared by methods known in the literature for analogous compounds. Exemplary of such starting materials are:

5-amino-2-chlorobenzophenone,
3-amino-4'-fluorobenzophenone,
3-amino-5-bromobenzophenone,
3-amino-4'-ethylbenzophenone,
3-amino-2'-ethoxybenzophenone,
3-amino-4'-ethoxybenzophenone, etc.

As noted previously, the compounds of the invention are, as a class, active anti-inflammatory agents, although some are more active than others. The anti-inflammatory activity can be conveniently demonstrated using assays designed to test the ability of these compounds to antagonize the local edema which is a characteristic of the anti-inflammatory response (rat foot edema test) and to inhibit the onset of the erythematous manifestation of inflammation (guinea pig erythema test).

These are standard assays well known to those skilled in the art. They are described in journals and other publications. Leading references to the rat foot edema test are:

(1) Adamkiewicz et al., Canad. J. Biochem. Physio. 33:332, 1955;
(2) Selye, Brit. Med. J. 2:1129, 1949; and
(3) Winter, Proc. Sec. Exper. Biol. Med 111:554, 1962

Leading reference to the guinea pig erythema test are:

(1) Wilhelmi, Schweiz. Med. Wschr. 79:577, 1949, and
(2) Winder et al., Arch. Int. Pharmacodyn 116:261, 1958.

Other standard assays well known to those skilled in the art may also be used to detect anti-inflammatory activity in the compounds of the present invention, for example, the cotton pellet granuloma test or the adjuvant arthritis test.

Preferred compounds of the invention because of very high anti-inflammatory activity and low toxicity are N-cyano-3-benzoyltrifluoromethanesulfonanilide and
N-cyano-3-benzoyldifluoromethanesulfonanilide In particular N-cyano-3-benzoyltrifluoromethanesulfonanilide has a therapeutic ratio ($LD_{50}/ED_{35}$) greater than 30, and has shown remarkable anti-inflammatory activity in the rat foot edema test.

The compounds of the invention are preferably administered orally, for example, as four percent acacia suspensions, but also may be administered parenterally. Amounts are generally about 1 to 500 mg./kg. of body weight of the mammal to be treated.

Many of the compounds of the invention are active as anti-microbial agents according to standard anti-microbial assays. Specifically, the anti-microbial activity of the compounds of the invention has been evaluated using a variation of the original agar-plate diffusion method of Vincent and Vincent (e.g., see Vincent, J. G., and Vincent, Helen W., Proc. Soc. Exptl. Biol. Med. 55:162-164, 1944, and Davis, B. D., and Mingioli, E.S., Jou. Bact. 66:129-136, 1953. Organisms against which they are active include *Staphylococcus aureus, Bacillus subtilis, Aspergillus niger, Canadida albicans, Streptococcus pyrogens* C-203 and *Chlorella ellipsoidea.*

The following examples are given for the purpose of further illustrating the procedures of the present invention, but are not intended, in any way, to be limiting on the scope thereof.

All melting points in the examples are uncorrected. The boiling points and melting points are given in degrees centigrade and the pressures in millimeters of mercury.

Example 1

Intermediate compounds corresponding to Formula III are prepared according to the following general procedure:

In a three-necked round-bottomed flask equipped with a magnetic stirrer, a reflux condenser, a thermometer and an additional funnel are placed a substituted aminobenzophenone, (30 mmole), chloroform (50 ml.) and N,N-dimethylaniline (33 mmole). To this stirred mixture a haloalkanesulfonic anhydride or haloalkanesulfonyl chloride (about 30 mmole) is added dropwise at such a rate that the reaction temperature does not exceed 45° C. The mixture is then stirred two hours at ambient temperature. The mixture is washed with five percent hydrochloric acid, then the solvent is removed in vacuo. The residue is taken up in five percent aqueous sodium hydroxide and washed with dichloromethane. The basic aqueous phase is then heated on a steam bath, treated with decolorizing charcoal and acidified with concentrated hydrochloric acid. This mixture is then extracted with dichloromethane, and the extracts dried over magnesium sulfate. The solvent is removed in vacuo, and the product purified by recrystallization or (usually) column chromatography followed by recrystallization, usually from saturated hydrocarbons or mixtures of benzene and saturated hydrocarbons.

Representative compounds prepared according to this procedure as intermediates are listed in Table I.

TABLE I

| Compound: | Melting point (in ° C.) |
|---|---|
| 3 - (3-trifluoromethylbenzoyl)trifluoromethanesulfonanilide | 86–88 |
| 2-benzoyldifluoromethanesulfonanilide | 79.5–81 |
| 3 - (4 - chlorobenzoyl)difluoromethanesulfonanilide | 127–129 |
| 3 - (4-methoxybenzoyl)fluoromethanesulfonanilide | 116.5–118.5 |
| 3 - benzoyl-4-bromotrifluoromethanesulfonanilide | 131 |
| 3 - (2,4 - dimethylbenzoyl)trifluoromethanesulfonanilide | 106–108 |
| 3 - (4 - ethylbenzoyl)trifluoromethanesulfonanilide | 90–91 |
| 3 - (3 - fluorobenzoyl)trifluoromethanesulfonanilide | 96–98 |
| 3 - benzoyl - 4 - chlorotrifluoromethanesulfonanilide | 106–108 |
| 3 - benzoyl - 5 - methoxytrifluoromethanesulfonanilide | 89–91 |
| 3 - benzoyl - (2 - hydroperfluoroethane)sulfonanilide | 80–80.5 |
| 3 - benzoyl - (2 - hydroperfluoro - n - propane)sulfonanilide | 94–96 |
| 3 - benzoylchloromethanesulfonanilide | 95–97 |
| 4 - chloro - 3 - (4 - fluorobenzoyl)difluoromethanesulfonanilide | 101–103 |
| 4 - chloro - 3 - (4 - methylbenzoyl)difluoromethanesulfonanilide | 77–79 |
| 4 - chloro - 3 - (4 - chlorobenzoyl)difluoromethanesulfonanilide | 81–83 |
| 3 - benzoyl - 4 - chlorochloromethanesulfonanilide | 130–133 |
| 3 - (2 - methylbenzoyl)fluoromethanesulfonanilide | 101–102 |
| 3 - (2 - chlorobenzoyl)chloromethanesulfonanilide | 99–101 |
| 3 - (2 - chlorobenzoyl)fluoromethanesulfonanilide | 123–125 |
| 3 - (4 - chlorobenzoyl)chloromethanesulfonanilide | 149–150 |
| 3 - benzoylperfluoro - n - butanesulfonanilide | (1) |

[1] B.P. 186° C./0.09 mm.

Example 2

Preparation of the sodium salt of 3-benzoyldifluoromethanesulfonanilide.—To a solution of 12.21 g. of reagent grade sodium hydroxide (0.305 mole) in 300 ml. of water are added 95 g. of 3-benzoyldifluoromethanesulfonanilide (0.305 mole). The mixture is stirred until dissolution is complete and the solution has a pH of 7.2 (sensitive pH paper). Water is removed to give a yellow solid which is taken up in about 200 ml. of glyme and treated with activated charcoal. The clear solution is then added dropwise with vigorous stirring to 5 liters of ethyl ether. The crystalline salt is isolated by filtration, washed with 4 liters of ethyl ether and dried to give the pure product, M.P. (dec.) 235° C.

*Analysis.*—Calculated for $C_{14}H_{10}F_2NaNO_3S$ (percent): C, 50.45; H, 3.05. Found (percent): C, 50.6; H, 3.2.

Other salts are made by the same process, substituting other alkali or alkaline earth metal hydroxides for sodium hydroxide.

Example 3

Preparation of N-cyano-3-benzoyltrifluoromethanesulfonanilide.—Sodium 3-benzoyltrifluoromethanesulfonanilide (25 g., 0.070 mole) is dissolved in 1,2-dimethoxyethane (400 ml.) by gentle heating. Cyanogen bromide (7.4 g., 0.070 mole) is dissolved in a small amount of 1,2-dimethoxyethane (glyme) and added to the warm solution. The mixture is heated to its reflux temperature and maintained there for one hour. The mixture is filtered to remove the solid and then evaporated in vacuo to give a heavy oil which solidifies on standing. The crude N - cyano - 3 - benzoyl - trifluoromethanesulfonanilide is purified by sublimation. It melts at 63–67° C. The infrared spectrum of this compound is consistent with the assigned structure.

*Analysis.*—Calculated for $C_{15}H_9F_3N_2O_3S$ (percent): C, 50.8; H, 2.6; N, 7.9. Found (percent): C, 50.5; H, 2.7; N, 7.7.

Example 4

Preparation of N-cyano-3-benzoyl - 4 - chlorotrifluoromethanesulfonanilide.—Sodium (0.62 g., 0.027 mole) is dissolved in methanol (100 ml.) then 3-benzoyl-4-chlorotrifluoromethaneulfonanilide is added and the mixture is stirred at room temperature for one hour. The mixture is then evaporated to dryness in vacuo to give sodium 3-benzoyl-4-chlorotrifluoromethanesulfonanilide. This salt is dissolved in acetone (100 ml.) and the solution is cooled to about 0° C. Cyanogen chloride (2.5 g., 0.040 mole) is bubbled into the stirred solution. The solution is then stirred at room temperature overnight. The mixture obtained is filtered to remove the solid formed. The filtrate is evaporated to dryness in vacuo to give N-cyano-3-benzoyl-4-chlorotrifluoromethanesulfonanilide. An infrared spectrum of this product supports the structural assignment.

By use of the procedure illustrated in the foregoing examples and using salts of the intermediates of Table I, the following compounds of the invention are also prepared:

N-cyano-3-(3-trifluoromethylbenzoyl)trifluoromethanesulfonanilide
N-cyano-2-benzoyldifluoromethanesulfonanilide
N-cyano-3-(4-chlorobenzoyl)difluoromethanesulfonanilide
N-cyano-3-(4-methoxybenzoyl)fluoromethanesulfonanilide
N-cyano-3-benzoyl-4-bromotrifluoromethanesulfonanilide
N-cyano-3-(2,4-dimethylbenzoyl)trifluoromethanesulfonanilide
N-cyano-3-(4-ethylbenzoyl)trifluoromethanesulfonanilide
N-cyano-3-(3-fluorobenzoyl)trifluoromethanesulfonanilide N-cyano-3-benzoyl-(1-hydroperfluoroethane)sulfonanilide
N-cyano-3-benzoyl-(2-hydroperfluoro-n-propane)-sulfonanilide
N-cyano-3-benzoylchloromethanesulfonanilide
N-cyano-4-chloro-3-(4-fluorobenzoyl)difluoromethane-sulfonanilide
N-cyano-4-chloro-3-(4-methylbenzoyl)difluoromethane-sulfonanilide
N-cyano-4-chloro-3-(4-chlorobenzoyl)difluoromethanesulfonanilide

What is claimed is:
1. A compound of the formula

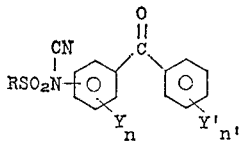

wherein R is a haloalkyl group selected from chloromethyl lower fluoroalkyl, or lower chloro-fluoroalkyl, the lower fluoroalkyl and lower chlorofluoroalkyl groups having at least one fluorine atom bonded to the alpha carbon atom or at least two fluorine atoms bonded to a beta carbon atom, Y and Y' are the same or different and are selected from halogen, lower alkyl, lower haloalkyl, lower alkoxy, lower haloalkoxy and $n$ and $n'$ are the same or different and are from zero to three.

2. A compound according to claim 1 wherein $n$ and $n'$ are zero.
3. A compound according to claim 1 wherein R contains one carbon atom.
4. A compound according to claim 3 wherein R is trifluoromethyl.
5. A compound according to claim 1 wherein the nitrogen atom and the carbonyl group of the formula are oriented meta to one another.
6. N-cyano - 3 - benzoyltrifluoromethanesulfonanilide according to claim 1.
7. N-cyano - 2 - benzoyldifluoromethanesulfonaniline according to claim 1.

References Cited
UNITED STATES PATENTS
3,576,866  4/1971  Robertson et al. ___ 260—556 F HENRY R. JILES, Primary Examiner
S. D. WINTERS, Assistant Examiner U.S. Cl. X.R.
260—556 A, 570 A, 543 R; 424—321

UNITED STATES PATENT OFFICE
CERTIFICATE OF CORRECTION

Patent No. 3,647,874                     Dated March 7, 1972

Inventor(s) John F. Gerster

It is certified that error appears in the above-identified patent and that said Letters Patent are hereby corrected as shown below:

Column 3, line 17, formula,

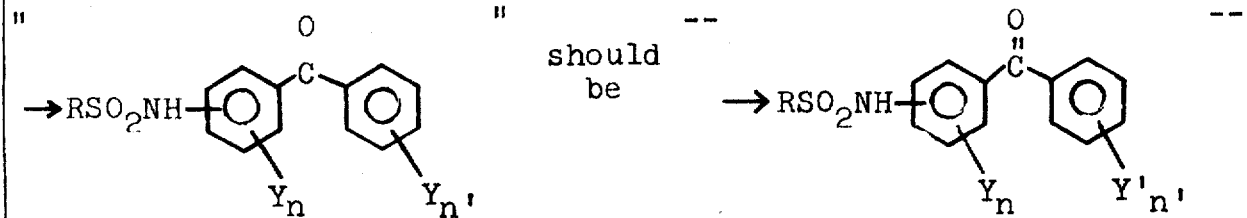

Column 3, line 22, following "n'" insert --Y and--

Column 4, line 32, "Sec." should be --Soc.--

Column 4, line 67, "Canadida" should be --Candida--

Signed and sealed this 13th day of August 1974.

(SEAL)
Attest:

McCOY M. GIBSON, JR.          C. MARSHALL DANN
Attesting Officer             Commissioner of Patents